Figure 1:
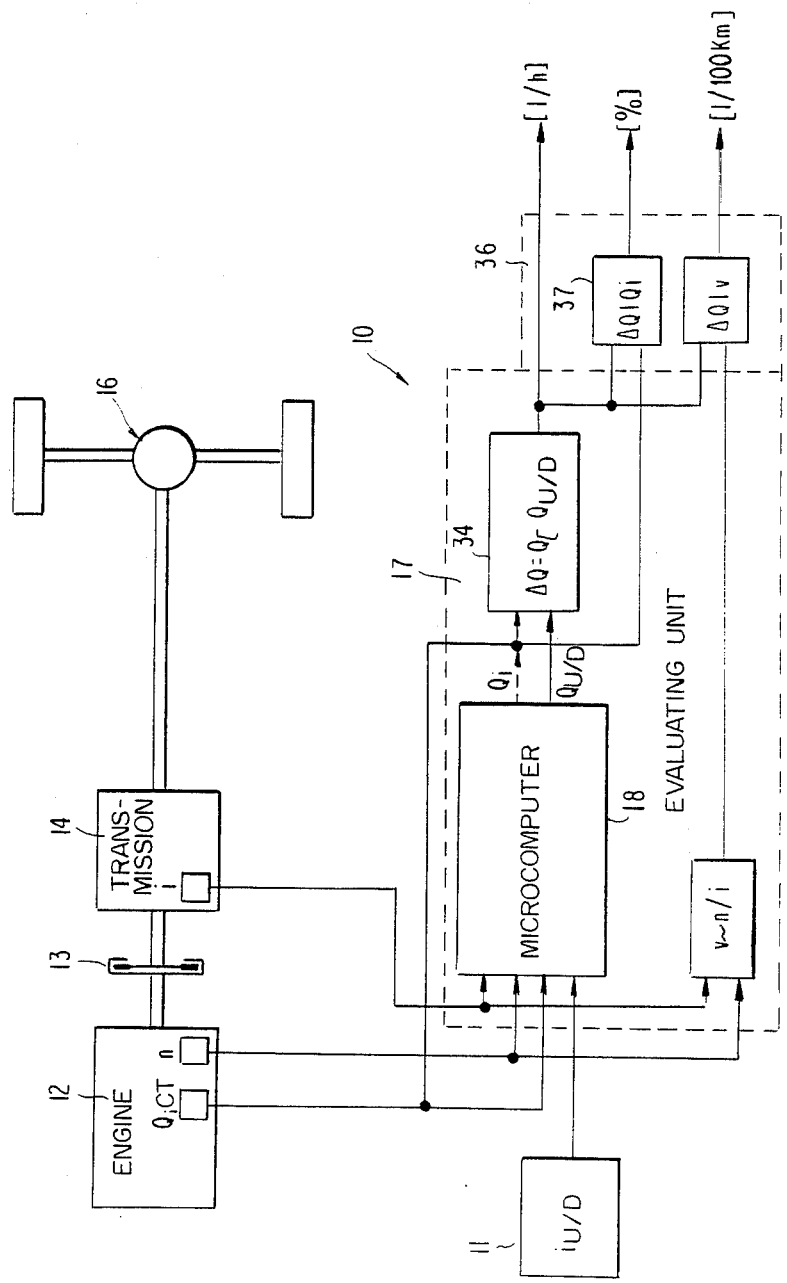

United States Patent [19]
Strifler

[11] Patent Number: 4,494,404
[45] Date of Patent: Jan. 22, 1985

[54] FUEL-CONSUMPTION MONITORING SYSTEM FOR MOTOR VEHICLES WITH MANUALLY-SHIFTED TRANSMISSIONS

[75] Inventor: Paul Strifler, Dettingen, Fed. Rep. of Germany

[73] Assignee: Daimler-Benz AG, Fed. Rep. of Germany

[21] Appl. No.: 441,058

[22] Filed: Nov. 12, 1982

[30] Foreign Application Priority Data

Nov. 19, 1981 [DE] Fed. Rep. of Germany ....... 3145687

[51] Int. Cl.³ .......................................... G01M 15/00
[52] U.S. Cl. ................................... 73/113; 340/52 R
[58] Field of Search .................. 73/114, 113; 364/442; 340/52 R

[56] References Cited

U.S. PATENT DOCUMENTS 4,355,296 10/1982 Drone ............................... 340/52 R

FOREIGN PATENT DOCUMENTS 7881 9/1982 European Pat. Off. .
2748227 6/1978 Fed. Rep. of Germany .

Primary Examiner—Jerry W. Myracle
Attorney, Agent, or Firm—Craig & Burns

[57] ABSTRACT

A fuel-consumption monitoring system for motor vehicles with manually-shifted transmissions is indicated, this system generating, from a processing operation involving performance data which are specific to the vehicle, as well as fuel-consumption data and operating-condition data, an output signal which is correlated with the instantaneous fuel consumption of the vehicle, which system is also capable of being activated, for example by output signals from a gearshift-recommendation transmitter, to emit a consumption-difference signal which is a direct measure of the fuel-consumption reduction which would be obtained if the gearshift-recommendation were followed. This lower-consumption signal is preferably displayed in liter/100 Kilometer units and is triggered only when a significant fuel saving can be achieved by a change of gear.

14 Claims, 7 Drawing Figures

FUEL-CONSUMPTION MONITORING SYSTEM FOR MOTOR VEHICLES WITH MANUALLY-SHIFTED TRANSMISSIONS

Fuel-consumption monitoring system for motor vehicles with manually-shifted transmissions, especially commercial vehicles, which are equipped with an evaluating and indicating unit which generates an output signal which is correlated with the instantaneous fuel consumption of the vehicle, and which unit is capable of being activated to emit an indicating signal informing the driver of the fuel utilization to be expected if another gear were selected, the evaluating and indicating unit generating the output signal from a processing operation involving performance data, which are specific to the vehicle and are stored in an electronic read-only memory in the evaluating unit, as well as data characterizing the fuel consumption and the operating-condition of the propulsion unit of the vehicle, it being possible to input these data to the evaluating unit.

Systems of this type are needed for commercial vehicles which, compared to passenger vehicles, have relatively low-powered engines, but which, for this reason, are equipped with manually-shifted transmissions having considerably higher numbers of gear ratios, for example 16 gears, in order to be able to make effective use of the installed engine power. Assuming that these gears are spaced in a conventional manner, for example in accordance with the so-called geometric ratio-spacing procedure, the same propulsive power can be obtained in several gears, albeit with varying degrees of fuel-utilization.

The purpose of a system of the type initially mentioned is to provide the driver with a decision-aid to enable him to optimize his choice of gear ratio, with regard to minimizing the fuel consumption, this optimum ratio being the one in which, in a given driving situation, the engine operates within its most advantageous efficiency range. Within the scope of a known system of the type initially mentioned, a pointer-type instrument is provided, which conveys an analog indication of the instantaneous fuel consumption, the high-consumption and low-consumption ranges being characterized as increasingly uneconomical or, as the case may be, increasingly economical, by means of different scale-plate color-markings. In addition, a microprocessor is provided, within the scope of the known system, this microprocessor generating indicating signals which inform the driver that, in an operating-condition of the engine, and/or of the vehicle, which he has brought about, for example, through having obeyed the consumption-induction, a reduction in the fuel consumption can be obtained by selecting a higher or, as the case may be, a lower gear, the microprocessor generating the indicating signals from a processing operation involving permanently stored engine-performance data and variable data, such as the position of the accelerator pedal, these signals being generated as parameters which are correlated with the instantaneous fuel consumption as well as with the engine and vehicle speeds, as parameters characterizing the operating-condition of the engine and/or of the vehicle.

Notwithstanding a quite significant fuel saving, which can be obtained if the driver, under the guidance of the consumption-indication, operates the accelerator pedal as economically as possible and, in addition, consistently follows the gearshift-recommendation signals, which are output as light signals, the known system nevertheless has the disadvantage that, as a result of the continuous display of the instantaneous fuel consumption, which, although certainly important with regard to how economically the vehicle is being driven, does not solely determine this degree of economy, the driver overrates the importance of its magnitude and, especially if he is consumption-conscious, he is misled into voluntarily dispensing with exploiting high engine power-values in order to accelerate or to maintain a particular road speed, with the result that, due to the generally low power-reserves possessed by commercial vehicles, the road performance deteriorates and the transport time increases. In many cases, the consequence of this is a vehicle-utilization which, despite the saving of fuel, is less economical overall.

There is the further factor that, in the case of the known system, the economizing effect which can be obtained by following a gearshift-recommendation, which is presented to the driver in the form of a yes/no proposal, cannot be assessed until the driver has actually changed gear. Since, on the one hand, this economizing effect will, in a large number of cases, be only very small, but, on the other hand, a considerable change in the road speed can occur as a result of the change of gear, for example if a change of gear is made while climbing a hill, and this change in the road speed subsequently necessitates a re-acceleration of the vehicle, consuming fuel at an extremely high rate, in order to re-enter the supposedly more advantageous consumption-range, following a gearshift-recommendation, in such a way will even cause an increase in the fuel overall consumption in situations occurring quite frequently.

The further system, known from German Offenlegungsschrift No. 2,928,318, is subject to essentially the same disadvantages, this system being designed to produce a statement as to whether a motor vehicle is being operated economically or uneconomically, in which system the driver is presented with gearshift-recommendations, likewise by means of light signals in the form of a yes/no proposal. In this known system, however, no quantitative indication of the fuel consumption is provided, so that the driver, after having followed a gearshift-recommendation, cannot reliably check the result thereof, an operation which would at least enable him to obtain empirical information regarding the effectiveness of the recommended gearshifting measures, information which he could, if appropriate, take into account as an aid to making a decision for or against an indicated gearshift-recomendation.

The invention accordingly produces a system of the type mentioned in the introduction, this system not only indicating a gearshift-recommendation to the driver, but also providing him with quantitative information with regard to the fuel consumption he should expect if he executes a change of gear ratio.

According to the invention, a fuel-consumption monitoring system is produced for motor vehicles with manually-shifted transmissions, especially commercial vehicles, which are equipped with an evaluating and indicating unit which generates an output signal which is correlated with the instantaneous fuel consumption of the vehicle, and which unit is capable of being activated to emit an indicating signal informing the driver of the fuel utilization to be expected if another gear were selected, the evaluating and indicating unit generating the output signal from a processing operation involving data which are specific to the vehicle and are stored in an electronic read-only memory in the evaluating unit, as well as data characterizing the fuel consumption and the operating-condition of the propulsion unit of the vehicle, it being possible to input these data to the evaluating unit, characterized in that the evaluating unit can be activated by means of interrogating signals which indicate those transmission-ratios which come into question for a change of gear, and in that the response signal, which the evaluating circuit generates on being thus activated, is a measure of the consumption-reduction or, as the case may be, consumption-increase which would be obtained if, at an engine power which remains constant, the gear ratio signalled by the interrogating signal in question were to be engaged, instead of the gear ratio currently engaged, and in that an indicating unit is provided, which displays the response signal in appropriate units, this signal being proportional to the consumption-difference.

In accordance with these features, the system according to the invention provides an indication of the difference in fuel consumption which would result if the driver were to shift from the gear ratio engaged at the instant in question, into that gear ratio which has been signalled by an interrogating signal which is input to the evaluating unit. From this consumption-difference indication, which can be presented in the driver in a digital format or as an analog-type indication, he immediately recognizes whether it would be sensible to change gear, for example because a significant reduction in fuel consumption could be obtained, despite the fact that he can foresee that this gear change will soon have to be cancelled again, perhaps because the traffic situation so requires, or because the road begins to climb, or whether this gear change could be avoided, because only a small fuel saving is to be expected.

It is particularly advantageous if the evaluating unit can be activated by means of the change-up or, as the case may be, change-down recommendation signals which are simultaneously displayed by a gearshift-recommendation transmitter. If the system according to the invention is configured in the manner, a signal indicating a consumption-difference is, at any instant, generated and displayed only when a change of gear, as indicated by the gearshift-recommendation, would actually also enable a fuel saving to be obtained.

Further, according to other features of the invention, alternative configurations of the evaluating unit of the monitoring system, in which the gearshift-recommendation signls output from a gearshift-recommendation transmitter, which may be constructed in any desired, known manner, can be utilized for the functionally appropriate activation of the evaluating unit.

According to such a system, for motor vehicles which are equipped with a fuel flowmeter, which generates an electrical output signal correlated with the instantaneous fuel consumption, and also equipped with a speed pick-up which generates an electrical output signal proportional to the engine speed, an evaluating unit generates the output signal which is correlated with the consumption to be expected if the gearshift-recommendation were followed, and which generates, by comparing this output signal with the output signal from the fuel flowmeter, a signal indicating a consumption-reduction, the evaluating unit generating the output signal which is correlated with the expected consumption, from a processing operation involving the measured values of the instantaneous consumption $Q_i$, the engine speed n, as well as stored data containing the association, specific to the engine, of the engine torque T with these measured values.

The signal characterizing the instantaneous fuel consumption is obtained by monitoring the position of the control rod of a fuel-injection pump, wherein the evaluating unit generates a first output signal, proportional to the instantaneous fuel consumption, from a processing operation involving the measured values of the control rod travel CT and of the engine speed n, as well as stored data containing the association, specific to the engine, of these measured values with the engine torque, and generates a second output signal, proportional to the fuel consumption which would result if the gearshift recommendation were followed, and generates the consumption reduction output signal by comparing the first and second output signals.

By means of another feature of the invention a configuration of the evaluating unit, in which the evaluating unit is itself co-utilized as the gearshift recommendation transmitter. The evaluating unit generates, within the scope of successive test cycles, a first signal, proportional to the fuel consumption which is characteristic of that gear ratio (i) of the transmission which is engaged, and a second signal, proportional to that fuel consumption which would result if the next higher transmission ratio ($i_U$) were engaged, as well as a third output signal, proportional to that fuel consumption which would result if a lower transmission ratio ($i_D$) were engaged, and a comparator is provided, which, from the comparison of these signals, which are proportional to the consumption, generates the gearshift recommendation signal in favor of the gear ratio which is associated with the lowest fuel consumption, if the consumption reduction which would result from this recommended change of gear exceeds a threshold value which can be preset or which has been preset.

A system falling within the concept of the invention can include an input unit, in addition to, or as an alternative to a gearshift recommendation transmitter, this input unit enabling the driver to determine, for any of the gear ratios available in the transmission, the difference in fuel consumption with respect to that gear ratio which is currently engaged. Such an input unit enables interrogating signals to be input into the evaluating stage, these signals being assigned to the possible gear ratios.

Accordingly, it is an object of the invention to produce an improved fuel consumption monitoring system.

It is a further object of the invention to produce a system which indicates a gear shift-recommendation to the driver, but also provides him with quantative information with regard to the fuel consumption he should expect if he executes a change of gear ratio.

It is another object of the invention to produce an evaluating means which can be activated by means of interrogating signals which indicate those transmission ratios which come into question for a change of gear, and in that the response signal, which the evaluating means generates on being thus activated, is a measure of the consumption-reduction or, as the case may be, consumption-increase which would be obtained if, at an engine power which remains constant, the gear ratio signalled by the interrogating signal in question were to be engaged, instead of the gear ratio currently engaged, and has an indicating unit which displays the response signal in appropriate units, the signal being proportional to the consumption-difference.

Another object of the invention is a fuel-consumption monitoring system for motor vehicles with manually-shifted transmissions, equipped with an evaluating means for generating an output signal correlated with the instantaneous fuel consumption of the vehicle, and for emitting an indicating signal informing the driver of the fuel utilization to be expected if another gear were selected, the evaluating and indicating means generating the output signal from a processing operation involving data which are specific to the vehicle and are stored in an electronic read-only memory in the evaluating means, and data characterizing the fuel consumption and the operating-condition of the propulsion unit of the vehicle, the evaluating means receiving interrogating signals which indicate possible transmission-ratios for a change of gear, the evaluating means comprising a means for generating a response signal as a measure of at least one of the fuel consumption-reduction and the fuel consumption-increase which would be obtained if, at an engine power which remains constant, the gear ratio signalled by the interrogating signal in question were to be engaged, instead of the gear ratio currently engaged, and an indicating means for displaying a response signal proportional to the consumption difference.

Figure 2:
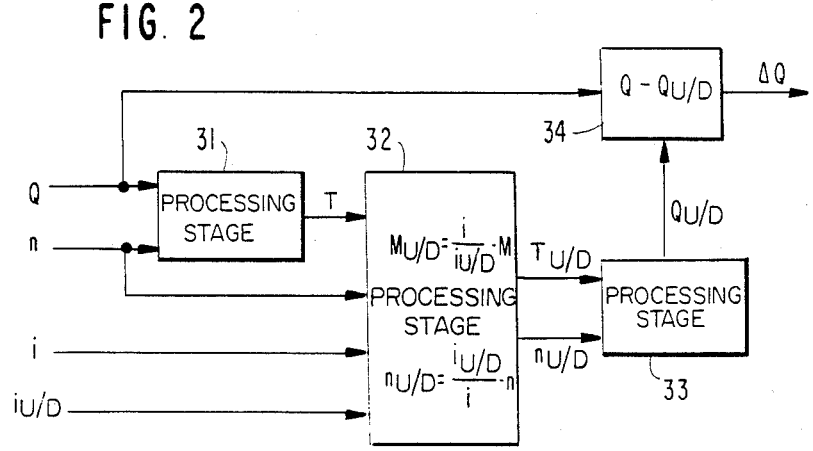
Figure 3:
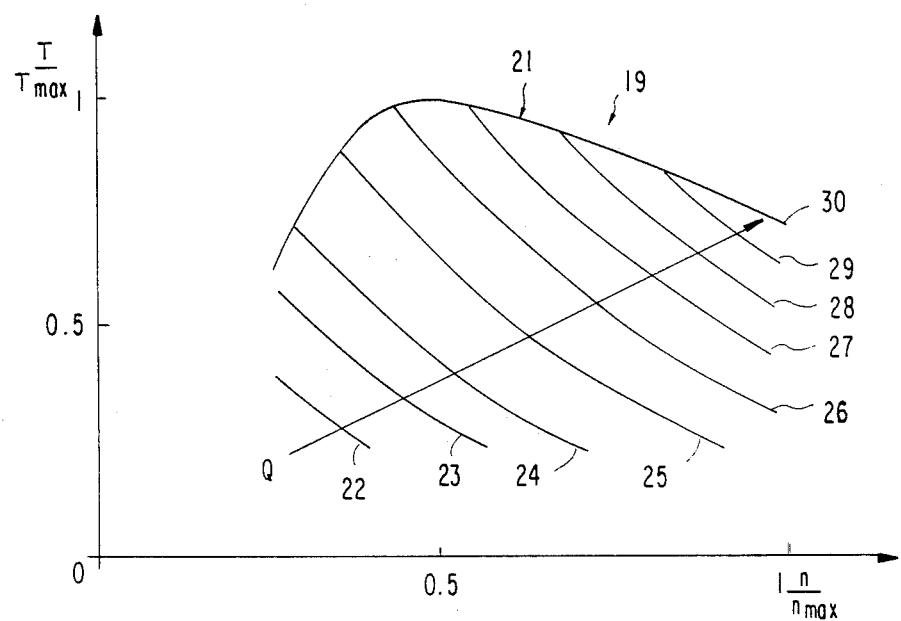
Figure 4:
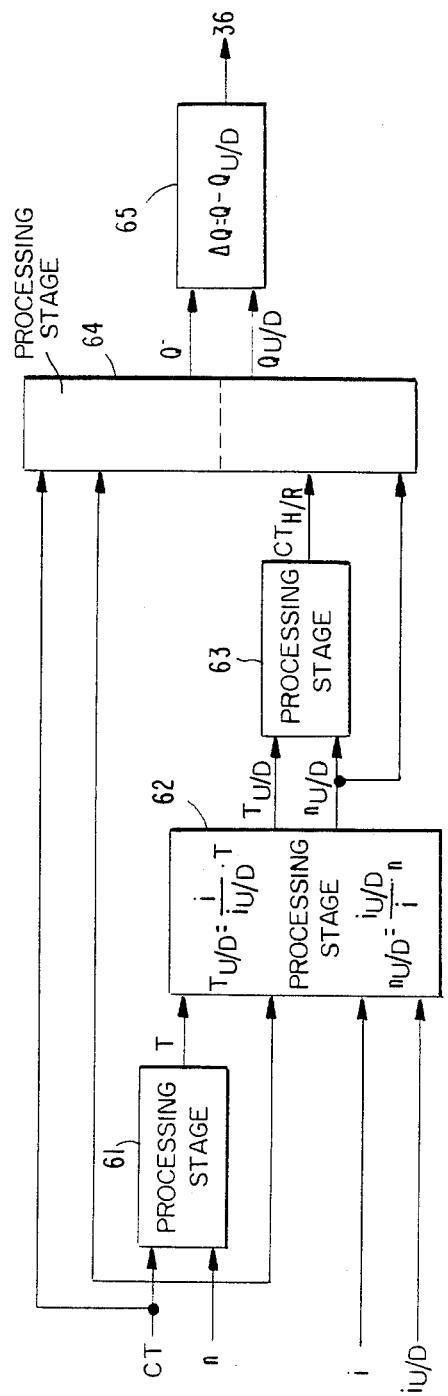
Figure 5:
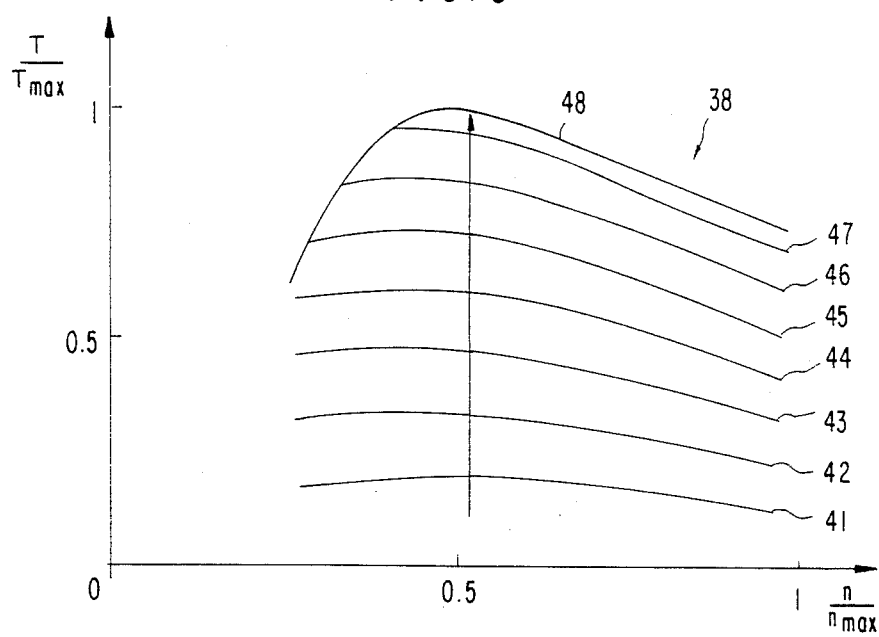
Figure 6:
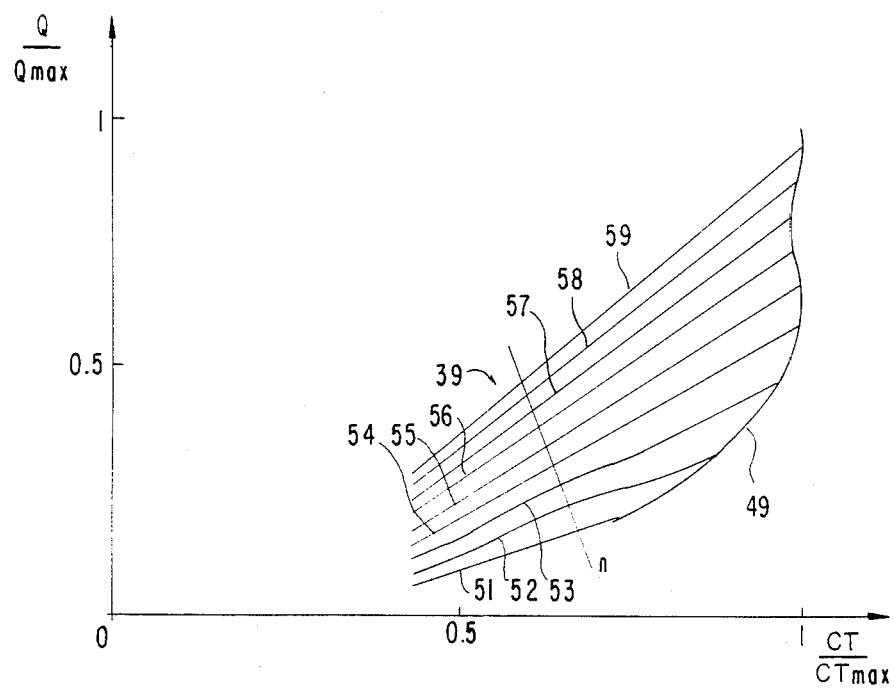
Figure 7:
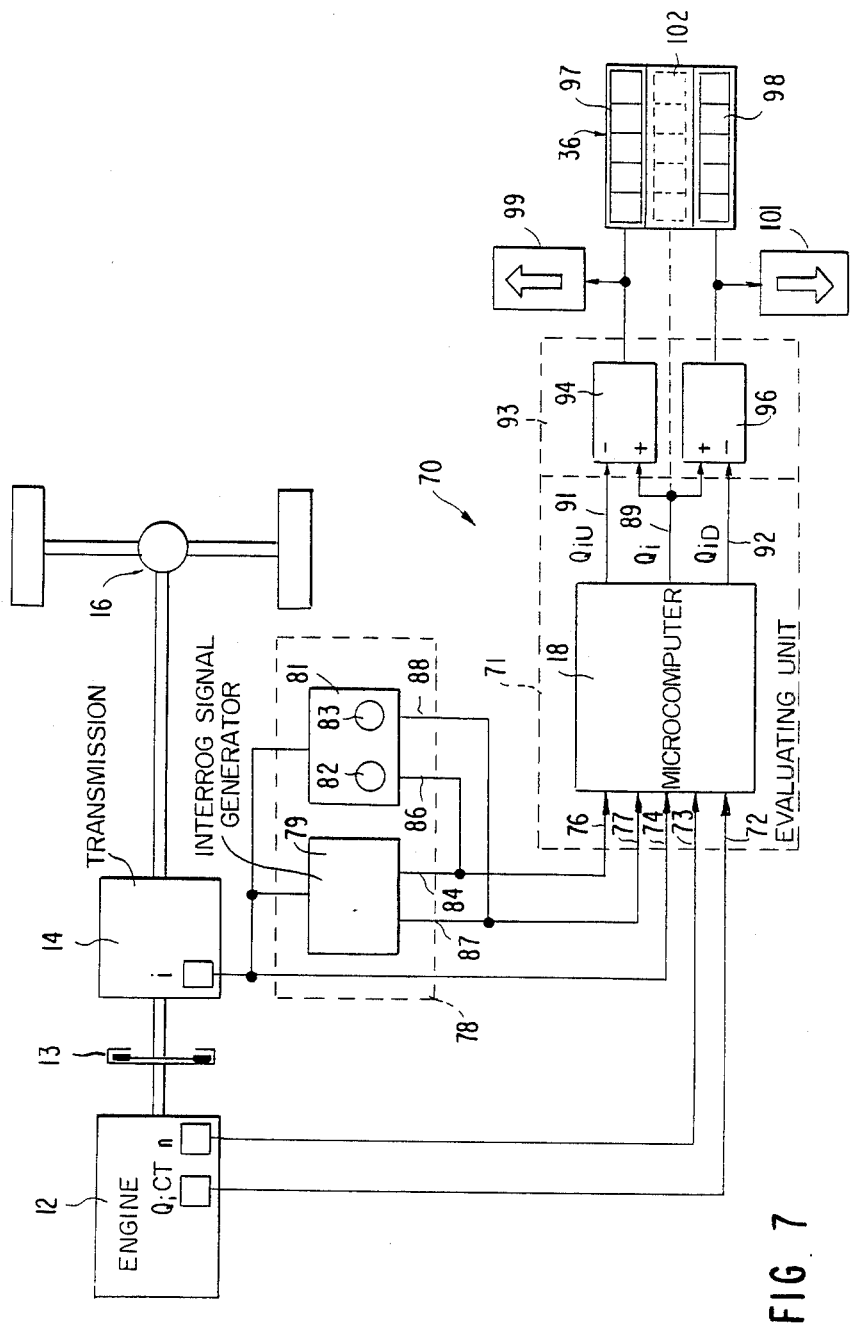

These and other objects, features and advantages of the present invention will become more apparent from the following description when taken in connection with the accompanying drawings which show, for the purposes of illustration only, embodiments in accordance with the present invention, and wherein:

FIG. 1 shows the basic construction of a fuel consumption monitoring system according to the invention, in a highly simplified diagrammatic representation, FIG. 2 shows a simplified block diagram of a first configuration of an evaluating stage which can be employed, within the scope of the system according to FIG. 1, for generating a consumption difference signal, FIG. 3 shows a set of performance curves which display the dependence of the engine torque on the engine speed, for various fuel consumption values, expressed as a function of time, in order to explain the function of the evaluating stage according to FIG. 2, FIG. 4 shows a simplified block diagram of a second configuration of an evaluating stage which can be employed, within the scope of the system according to FIG. 1, for generating a consumption difference signal, FIGS. 5 and 6 respectively represent a set of performance curves, which describe the dependence of the engine torque on the engine speed, for various values of the travel of the control rod of the injection pump of a diesel engined vehicle and the dependence of the fuel consumption on the travel of the control rod for various engine speed values, in order to explain the function of the evaluating stage according to FIG. 4, and FIG. 7 shows a further illustrative embodiment of a system according to the invention, in a representation corresponding to that of FIG. 1.

In the figures wherein like reference numerals represent like features, the fuel consumption monitoring system 10, according to the invention, represented in its basic features in FIG. 1 and in detail in FIGS. 2 or, alternatively, FIG. 4, is designed for a motor vehicle which is also equipped with a gear shift recommendation transmitter 11. The motor vehicle, which may be presumed, without any limitation of generality, to be a heavy commercial vehicle, is represented in FIG. 1 merely by its drive train, which comprises the engine 12, the clutch 13, the manually shifted transmission 14 and the driven axle 16, it being possible for the manually shifted transmission 14 to have sixteen gears, with geometric, or approximately geometric ratio spacing.

If the transmission 14 is configured, in the above manner, with closely spaced gear ratios, and if the propulsion engine 12 is of conventional design, it is possible to utilize or obtain a particular power output from the engine, or to obtain a desired vehicle performance, in more than one gear, for example, in three gears, while it is possible, however, for the fuel consumption to vary considerably in the various possible gears, the fuel consumption being referred to unit time and/or to a reference distance covered.

The purpose of the gear shift recommendation transmitter 11, which is initially assumed, with reference to its construction and function, as known, is to generate indicating signals which enable the driver to recognize in which gear ratio of the transmission 14 a desired engine and/or vehicle performance can be associated with the lowest possible fuel consumption, the gear shift recommendation transmitter generating these indicating signals from a suitable processing operation involving stored engine performance data and measured operating data.

The system 10 according to the invention is, moreover, intended to provide an indication of the fuel saving which is possible if the gear shift recommendation is followed and, if this saving is significant, to give the driver, by means of this indication, an additional stimulus to comply with the change-up recommendation (U) signalled by the gear shift recommendation transmitter 11, or with a change-down recommendation (D) which may likewise be signalled. An additional stimulus of this nature, which can be triggered by indicating a very significant possible saving, is necessary, in particular, when the driver has initially decided, within his "forecasting horizon", namely within the amount of road which he can see, or which is known to him in other ways, and/or within the visible traffic situation, not to execute a gear change.

The central functional element of the system 10, according to the invention, is an evaluating unit, which is marked, in its entirety, 17, and which generates an output signal which is a measure of the lower fuel consumption which would be established if the driver were to follow the "U" gear shift recommendation or "D" gear shift recommendation signalled by the gear shift recommendation transmitter 11, the evaluating unit generating this output signal from a suitable electronic processing operation, in a microcomputer 18, involving stored data describing the performance of the drive train 12, 13, 14 and 16, especially of the engine 12 and of the transmission 14, with variable data, which are continuously input into the microcomputer 18, and which contain the information relating to the operating condition of the engine 12, the gear ratio currently selected in the transmission 14, and the information regarding the gear ratio which is most favorable in terms of fuel consumption, this latter information being obtained by means of the gear shift recommendation transmitter 11.

It will be appreciated to those skilled in the art that the microcomputer 18 may take a variety of forms. In one form, it may consist of one or more chips, the electronic architecture of which includes input and output circuitry, an arithmetic unit admitting of at least four-function arithmetic operations, memory and a program control unit. Such a configuration may be tailored to the particular vehicle in which it is used with pre-stored program and data representing the data characteristics of the vehicle operation.

Advantageously, such a configuration may also admit of manual control whereby the program and data may be changed, if desired, by way of a keyboard.

While higher level languages, such as, FORTRAN and BASIC, may be used, characteristically, economy of memory use and increased speed may be effected by the well known expedient of employing a lower-level language such as assembly language or machine language.

Choice of architecture for the microcomputer together with language and programming technique, it will be recognized, is within the skill of those working in the art and, accordingly, the details thereof will not be introduced to this disclosure except insofar as the nature of the invention requires.

A first specific illustrative embodiment of the monitoring system 10 according to the invention, is now explained in more detail with reference to FIGS. 1 to 3, to the details of which readers are expressly referred.

In this illustrative embodiment, FIG. 3 shows a set 19 of performance data which are specific to the engine 12 of the vehicle, and are permanently stored in the microcomputer 18, in tabular or analytical form. This set 19 of performance data reproduce the relationship between the engine torque T and the engine speed n, the speed, referred to the maximum engine speed $n_{max}$ as $n/n_{max}$, being plotted as abscissae in the representation forming FIG. 3, and the engine torque, similarly referred as $T/T_{max}$ to the maximum engine torque $T_{max}$, being plotted as ordinates. To every point within this set 19 of performance data which is located beneath the full power curve 21, there corresponds a particular engine power, which is proportional to the product of the magnitudes of its coordinates. The curve branches 22 to 30 which run, to a rough approximation, more or less hyperbolically beneath the full power curve 21, delineate operating conditions characterized by equal time referenced fuel consumption values, the outermost lefthand curve 22 representing, according to FIG. 3, a very low fuel consumption of, for example, 10 l/h (liters/hour), and the outermost righthand upper curve branch 30 representing operating conditions with a high fuel consumption of, for example, 80 l/h. Consequently, a particular fuel consumption value is also unambiguously associated with each pair of torque/speed values or engine power values, so that this fuel consumption value can be determined from the set 19 of performance data, if the engine torque and engine speed are known. Correspondingly, if the instantaneous engine fuel consumption Q and the engine speed n are known, it is also possible to determine, from the set 19 of performance data, the engine torque associated with these fuel consumption and speed values, provided, of course, that the maximum torque $T_{max}$ and the maximum speed $n_{max}$ of the engine 12 are known.

Thus, the memory of the microcomputer 18 may store data such that three data elements are linked as being associated, a value of engine torque T, a value of engine speed n and a value of fuel consumption Q. The number of such associated data elements as stored in memory constitute a numerical representation for which FIG. 3 is a graphical representation.

As variable data, the evaluating unit 17 receives the following measured quantities, in a format suitable for digital processing in the microcomputer 18:

1. The instantaneous fuel consumption Q of the engine 12, this quantity being available from fuel flow measurements, for example by means of a small axial turbine or an oval wheel flowmeter, and which is readily amenable to conversion into a digital measure signal.

2. The engine speed n, which is preferably sensed by means of an inductive pulse transmitter, located in the vicinity of the toothed rim of the engine flywheel.

3. The transmission ratio i, which is effective at the moment in question, of the transmission 14, and which can be determined either by an appropriate measurement of the transmission output speed, followed by a comparison of this speed with the engine speed n, or by electrically sensing the gear shift lever position, the resulting ratio signal being amenable to conversion into a characteristic digital signal.

4. The output signal, $i_{U/D}$ from the gear shift recommendation transmitter 11, which signal likewise reproduces, in a suitable digital format, that transmission ratio which is optimum for the lowest possible fuel consumption, and which transmission ratio should be selected by changing-up (U) or, as the case may be, by changing-down (D).

These input values are processed, in the microcomputer 18, with the engine performance data, according to FIG. 2, which are stored in this microcomputer, in the following manner:

In a first processing stage 31, the torque T of the engine is determined, by reference to the stored performance data, from the measured values of the instantaneous fuel consumption Q and of the speed n of the engine 12. The torque $T_{U/D}$ and the engine speed $n_{U/D}$ which would result if the driver were to follow the above-mentioned gear shift recommendation, are determined, on the one hand, in a second processing stage 32, subject to the secondary condition that the engine power following compliance with a gear shift recommendation, provided by the gear shift recommendation transmitter 11, should be the same as before the change of gear. These two quantities are determined, in this second processing stage, in accordance with the relationships:

$$T_{U/D} = \frac{i}{i_{U/D}} \cdot T \tag{1}$$

and $$n_{U/D} = \frac{i_{U/D}}{i} \cdot n \tag{2}$$

From these two quantities, and once again utilizing the stored data representing the set 19 of performance curves, the fuel consumption $Q_{U/D}$ is determined, in a third processing stage 33, this fuel consumption value being associated with the pair of values $T_{U/D}$ and $n_{U/D}$. In this processing stage, the microcomputer 18 with a pair of values for $T_{U/D}$ and $n_{U/D}$ generated in stage 32, searches the permanently stored data represented by FIG. 3, and from the stored data, reads out the corresponding value of Q as $Q_{U/D}$.

It will be appreciated $Q_i$, the measured fuel consumption output of the mircocomputer 18, may be that measured by flow meter or other means as explained above, at the engine 12, which value identified as Q was input from the engine 12 to the microcomputer 18.

Finally, the output signal associated with the fuel consumption difference $\Delta Q$ is generated, in a fourth processing stage 34, by subtracting the fuel consumption value $Q_{U/D}$ computed, as described above, from the measured value Q, this output signal, corresponding directly to the fuel saving which can be obtained per unit of time, being displayed to the driver, in digital or analog form, for example in units of l/h by means of an indicating unit 36, FIG. 1.

Within the scope of this indicating unit 36, it is additionally possible to provide a divider element 37 which, by forming the quotient of the $\Delta Q$ output signal from the fourth processing stage 34 and the output signal from the fuel flowmeter, generates an output signal which is proportional to the ratio $\Delta Q/Q_i$, and which can be displayed in unit corresponding to the percentage fuel saving. Finally, by dividing the time referenced consumption difference signal $\Delta Q$ output from the processing stage 34 by a signal v which is proportional to the speed of the vehicle, the latter signal being obtainable by dividing the engine speed n by the transmission ratio i of the transmission 14, it is also possible to generate a consumption difference signal which is referred to the distance covered, this signal being displayed, preferably in 1/100 km units, within the scope of the indicating unit 36.

The illustrative embodiment of a monitoring system 10 according to the invention, to be explained in the text below, once again, with regard to its function, with reference to FIG. 1, but also by reference to FIGS. 4 to 6, is specifically designed for an application in a diesel engined motor vehicle and differs from the system previously explained essentially in that the input which characterizes the fuel consumption and is supplied to the microcomputer 18 is obtained by measuring the travel CT of the control rod of the injection pump. The other inputs, n, i and $i_{U/D}$, are identical to those in the case of the illustrative embodiment explained by reference to FIGS. 1 and 2.

In further contrast to this illustrative embodiment, the sets 38 and 39 of performance data, represented in FIGS. 5 and 6, are permanently stored in analytical or tabular form in the microcomputer 18, the set 38 of performance data once again reproducing the relationship between the engine torque T and the engine speed n, in a normalized representation corresponding to the representation of the set 19 of performance data according to FIG. 3. In this case, the curves 41 to 47 of the set 38 of performance data represent operating conditions characterized by the same control rod travel, the lowest curve 41, according to FIG. 5, corresponding, in a typical case, to a control rod travel of, for example, 5 mm, while the full power curve 48 corresponds to a control rod travel of 11.5 mm. The curves 42 to 47 of equal control rod travel CT, which run between this full power curve and the lowest curve 41, correspond, in each case, to a 1 mm gradation in the control rod travel.

The memory of microcomputer 18 thus stores data elements for engine torque T, engine speed n and a corresponding value of control rod travel CT.

The set 39 of performance data, according to FIG. 6, reproduce the dependence of the fuel consumption Q on the control rod travel CT, the control rod travel, normalized to the maximum control rod travel $CT_{max}$, that is to say, $CT/CT_{max}$, being plotted as abscissae, and the fuel consumption normalized to the maximum consumption $Q_{max}$, that is to say, $Q/Q_{max}$, being plotted as ordinates. The relationships which result, in each case at a constant engine speed, are delineated by the fuel consumption curves 51 to 59, which run approximately linearly and terminate at the full power curve 49, the lowest fuel consumption curve 51 corresponding, in the typical case considered, to an engine speed of 600 rpm, and the uppermost fuel consumption curve 59 corresponding to an engine speed of 2,200 rpm.

The memory of microcomputer 18 thus stores data elements for fuel consumption Q, control rod travel CT with corresponding values for engine rpm.

In this case, the processing of the data which are represented by the sets 38 and 49 of performance curves, and which are permanently stored in the microcomputer 18, with the variable input data, is accomplished according to the procedure represented in FIG. 4.

In a first processing stage 61, the engine torque T is determined from the measured values of the control rod travel CT and of the engine speed n, taking account of the data which have been stored in order to represent the set 38 of engine performance curves. The torque $T_{U/D}$ and the engine speed $n_{U/D}$, which would result if the driver were to follow a gear shift recommendation signalled by the gear shift recommendation transmitter 11, are determined in a second processing stage 62, in accordance with the same conditions as explained by reference to FIG. 2 and by means of the same operations. Once again utilizing the stored data representing the set 38 of performance curves, the control rod travel $CT_{U/D}$ is determined, which is associated with the pair of values $T_{U/D}$ and $n_{U/D}$, this calculation being performed in a third processing stage 63. In a fourth processing stage 64, the fuel consumption values $Q_B$ and $Q_{U/D}$ are determined, by reference to the data which are stored, specifically for the engine in question, in order to represent the set 49 of performance curves of FIG. 6, these fuel consumption values being associated with the pairs of values CT, n and $CT_{U/D}$, $n_{U/D}$ and respectively representing the fuel consumption $Q_B$ before the emission of the gear shift recommendation, and the consumption $Q_{U/D}$ following compliance with the gear shift recommendation. From this consumption value, which is obtained, on the one hand, from a measurement and, on the other hand, from the calculation procedure in the microcomputer 18, the consumption difference signal $\Delta Q$ is finally obtained in the last processing stage 65, this being the signal which is utilized for the display.

FIG. 7, to the details of which readers are expressly referred, shows the basic construction of a further embodiment of a system 70 according to the invention, which differs from the system according to FIG. 1 essentially in that its evaluating unit 71 generates not only the signals indicating the consumption difference, which are intended as a decision-aid for the driver, but also generates the gear shift recommendation signals, which indicate to the driver the optimum gear ratio, that is to say, in this case the evaluating unit 71 also fulfills, in conjunction with further circuit elements, the function of the gear shift recommendation transmitter which is marked 11 in FIG. 1. As previously indicated, functional elements of the system 70 according to FIG. 7, which are functionally identical to those of the system 10 according to FIG. 1, or which have analogous functions, are, moreover, given the same reference numbers.

At a first input terminal 72, the microcomputer 18 of the evaluating unit 71 receives an input signal which is characteristic of the instantaneous fuel consumption, for example, the output signal from a fuel flowmeter, or the output signal from a pick-up device monitoring the control rod travel, and receives, at a second input terminal 73, an input signal which is characteristic of the speed n of the engine 12. An input signal which characterizes the gear ratio currently engaged of the transmission 14, is supplied to the microcomputer 18 at a third input terminal 74, the transmission ratio i corresponding to this gear ratio. At a fourth input terminal 76, and at a fifth input terminal 77, the microcomputer 18 is supplied with the output signals from an interrogating signal transmitter 78, and which is provided in place of a gear shift recommendation transmitter, in order to designate transmission ratios for which the evaluating unit 71 should generate a consumption difference output signal referred to the gear ratio currently engaged.

In the specific illustrative embodiment represented, the interrogating signal transmitter 78 comprises a first sub-unit 79, which generates interrogating signals in a cyclic sequence, under clock control, these signals designating both higher and lower gear ratios than the ratio currently engaged. A second sub-unit 81 is provided, by means of which the driver can trigger an interrogating signal, for example by operating pushbuttons 82 and 83, this signal designating any desired gear ratio, which may be higher or lower than the ratio currently engaged. These two sub-units 79 and 81 can, as represented, be designed in such a manner that those interrogating signals which designate a gear ratio of the transmission 14 which is higher than the gear ratio currently engaged, are always emitted, in each case, at a first output terminal 84, or 86, which is connected to the fourth input terminal 76 of the microcomputer 18, and that those interrogating signals which designate a gear ratio lower than the ratio currently engaged are emitted at a second output terminal 87, or 88, which is connected to the fifth input terminal 77 of the microcomputer 18. Sub-units 79 and 81 may take any one of a variety of forms understood by those skilled in the art. It will be appreciated that digital signals are available, as previously explained, from transmission 14 representing the particular gear ratio in use in transmission 14.

In an exemplary form, sub-unit 79 may store a series of data signals corresponding in magnitude to each of the magnitudes of the gear ratios of transmission 14. When a signal with a magnitude representing a particular gear ratio is received by sub-unit 79, it may be successively compared with the magnitudes of the stored signals representing the series of gear ratios of the transmission 14. Such a comparison step may take the form of successive subtraction steps, wherein the incoming signal is subtracted successively from each of the stored gear ratio magnitude signals. Upon determination of an identity, that is, the result of the subtraction being zero, sub-unit 79 may then select from its stored values of gear ratio signals, the two gear ratio signals which are higher and lower in magnitude than the magnitude of the signal received from transmission 14 from which the identity resulted. These two signals are respectively transmitted on output lines 84, representing "high" and 87, representing "low." Thus, sub-unit 79, having received a single gear ratio signal, produces two outputs, each representing a higher gear ratio and a lower gear ratio than that represented by the input signal.

Sub-unit 81, in an exemplary form, may store gear ratio signals in the same fashion and perform the same comparison or subtraction steps and the selection step for the higher and lower magnitude gear ratio signals as described in connection with sub-unit 79. The transmission of an output from sub-unit 81 on output leads 86 and 88, however, is effected only by actuation by the vehicle driver of one of the pushbutton switches 82 and 83, respectively. Thus, the vehicle driver may serve to transmit to the microcomputer 18, a signal representing a gear ratio higher than the gear ratio input signal received from transmission 14 by actuating switch 82, thus supplying an output on 86 to input 76 or, alternatively, he may actuate switch 83 to produce an output on 88 representing a gear ratio lower than that of the signal input from the transmission 14 thus generating an input signal to the microcomputer on input 77.

These input signals are processed in the microcomputer 18, as explained in detail by reference to FIGS. 2 and 4, the microcomputer 18 emitting, at a first output terminal 89, an output signal which reproduces the magnitude of the instantaneous fuel consumption $Q_i$ associated with the gear ratio currently engaged, and emitting, at a second output terminal 91 or, as the case may be, at a third output terminal 92, an output signal which reproduces, respectively, the fuel consumption $Q_{iU}$ or $Q_{iD}$, which is to be expected if the driver selects the gear ratio designated by the interrogating signal from the first sub-unit 79, or from the second sub-unit 81.

A comparator 93, is provided as the output stage of the evaluating unit 71, this comparator generating, from the comparison of these outputs $Q_i$, $Q_{iU}$ and $Q_{iD}$ from the microcomputer 18 which are proportional to the fuel consumption, a gear shift recommendation signal in favor of the gear ratio associated with the lowest consumption, provided that the consumption reduction associated with selecting this gear ratio exceeds a threshold value which can be preset or which has been preset, and stored in the microcomputer 18 for future reference.

This comparator 93 comprises a first comparison stage 94, which receives, as a first input signal, the instantaneous consumption signal $Q_i$ from microcomputer 18 or, as the case may be, from a flowmeter and which receives, as a second input signal, the $Q_{iU}$ output signal from the microcomputer 18, together with a second comparison stage 96, which likewise receives, as a first input signal, the instantaneous fuel consumption signal, $Q_i$, and, as a second input, signal the $Q_{iD}$ output signal from the microcomputer 18, the latter signal being a measure of the fuel consumption which would result in the event of selecting a lower gear. The two comparison stages 94 and 96 respectively generate an output signal which is proportional to the difference $\Delta Q_{iU}=Q_i-Q_{iU}$ and $\Delta Q_{iD}=Q_i-Q_{iD}$, these signals being proportional to the consumption reduction or, as the case may be, consumption increase, depending on which of the consumption values is the greater, which can be obtained by changing gear. Whenever the consumption difference output signal from either of the two comparison stages 94 and 96 indicates a consumption reduction of a magnitude exceeding the above-mentioned threshold value, this consumption reduction is displayed, in suitable units, on a display window 97 or, as the case may be, 98 of the indicating unit 36, while at the same time the corresponding change-up or, as the case may be, change-down recommendation is signalled to the driver in an associated display window 99 or 101. A third display window 102 can additionally be provided, in order to display an instantaneous consumption value $Q_i$.

The utilization of the evaluating stage 71 of the system 70, as arranged within the scope of this system, for the purpose of generating the gear shift recommendation signals, enables an advantageously simple construction to be achieved overall.

An advantage common to the use of the systems 10 and 70 according to the invention resides in the fact that a display signal, attracting the attention of the driver, is generated only when a significant consumption reduction can be obtained as a result of a change of gear, or if the driver triggers an interrogating signal, and in the fact that the consumption reduction which is obtainable can be indicated very accurately as a consumption difference.

While I have shown and described plural embodiments in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A fuel consumption monitoring system for motor vehicles with manually shifted transmissions, equipped with a processing and evaluating means for generating an output signal correlated with the instantaneous fuel consumption of the vehicle, and with an indicating means for emitting an indicating signal informing the driver of the fuel utilization to be expected if another gear were selected, the processing, evaluating and indicating means generating the output signal from a processing operation involving data which are specific to the vehicle and are stored in an electronic read only memory in the evaluating means, and data characterizing the fuel consumption and the operating condition of the propulsion unit of the vehicle, the processing and evaluating means receiving interrogating signals which indicate possible transmission ratios for a change of gear, the evaluating means comprising
    means for generating a response signal as a measure of at least one of the fuel consumption reduction and the fuel consumption increase which would be obtained if, at an engine power which remains constant, the gear ratio signalled by the interrogating signal in question were to be engaged, instead of the gear ratio currently engaged, and
    indicating means for displaying a response signal proportional to the consumption difference.

2. A system according to claim 1, for vehicles equipped with a gear shift recommendation transmitter, which generates a gear shift recommendation signal indicating the gear ratio with the optimum fuel utilization, comprising
    means for generating a gear shift recommendation signal from a transmitter as an input to the evaluating means.

3. A system according to claim 1, for motor vehicles which are equipped with a fuel flowmeter, which generates a first electrical output signal correlated with the instantaneous fuel consumption, and are also equipped with a speed pick-up which generates second electrical output signal proportional to engine speed, wherein the evaluating means comprises
    means for generating a third output signal correlated with the consumption to be expected if the gear shift recommendation were followed,
    means for comparing the third output signal with the first output signal from the fuel flowmeter to produce a signal indicating a consumption reduction, the evaluating means generating the output signal which is correlated with the expected consumption, from a processing operation involving the measured values of instantaneous fuel consumption $Q_i$, the engine speed n, and stored data containing the association, specific to the engine, of the engine torque T with the said measured values.

4. A system according to claim 1, in which the signal characterizing the instantaneous fuel consumption $Q_i$ is obtained by monitoring the position of the control rod of a fuel injection pump, wherein the evaluating means comprises means for generating a first output signal, proportional to the instantaneous fuel consumption, from a processing operation involving the measured values of the control rod travel CT and of the engine speed n, as well as stored data containing the association, specific to the engine, of these measured values with the engine torque T, generating a second output signal, proportional to the fuel consumption which would result if the gear shift recommendation were followed and generating the consumption reduction output signal by comparing the first and second output signals.

5. A system according to one of claims 1, 2, 3 or 4, wherein the evaluating means comprises
    means for generating, within the scope of successive test cycles, a first signal, proportional to the fuel consumption which is characteristic of that gear ratio (i) of the transmission which is engaged, and a second signal, proportional to that fuel consumption which would result if the next higher transmission ratio ($i_U$) were engaged, as well as a third output signal, proportional to that fuel consumption which would result if a lower transmission ratio ($i_D$) were engaged, and
    a comparator means, which, from the comparison of these signals, which are proportional to the consumption, generates the gear shift recommendation signal in favor of the gear ratio which is associated with the lowest fuel consumption, if the consumption reduction which would result from this recommended change of gear exceeds a threshold value which can be preset or which has been preset.

6. A system according to claim 1, further comprising an input means for enabling interrogating signals designating the possible gear ratios to be input into the evaluating means.

7. A system according to claim 1, wherein the indicating means comprises
    means for displaying the consumption difference in liters per kilometer.

8. A system according to claim 1, wherein the indicating means comprises
    means for displaying the consumption difference as a percentage of the fuel consumption which is associated with the gear ratio currently engaged.

9. A fuel consumption monitoring system for motor vehicles with manually-shifted transmissions comprising means for generating a signal representing a recommended transmission gear ratio, means for generating a signal representing present operating transmission gear ratio, means for generating a signal representing engine speed, and means for generating a signal representing instantaneous fuel consumption, said fuel consumption monitoring system further comprising first means in response to at least one of the signals representing the recommended transmission gear ratio, present operating transmission gear ratio, the engine speed, and the instantaneous fuel consumption, for generating a first output signal representing fuel consumption at the recommended gear ratio and means for displaying a second signal representing the difference between a signal representing an instantaneous value of fuel consumption and said first output signal.

10. A fuel consumption monitoring system in accordance with claim 9, further comprising means for displaying a signal representing a quotient of said second signal divided by a signal representing the instantaneous value of fuel consumption.

11. A fuel consumption monitoring system in accordance with claim 9, further comprising means for displaying a signal representing a quotient of said second signal divided by a signal representing a value of vehicle speed.

12. A fuel consumption monitoring system in accordance with claim 9, further comprising means for displaying a signal representing a recommended gear ratio in response to the output of said first means.

13. A fuel consumption monitoring system in accordance with claim 12, further comprising means for inputting to said first means a signal representing at least one of a transmission gear ratio higher and a transmission gear ratio lower than a present operating transmission gear ratio.

14. A fuel consumption monitoring system in accordance with claim 13, further comprising means for manually controlling the input to said first means of said signal representing at least a higher and lower gear ratio.

* * * * *